US008054751B2

(12) United States Patent
Elie-Dit-Cosaque et al.

(10) Patent No.: US 8,054,751 B2
(45) Date of Patent: Nov. 8, 2011

(54) REMOTE ACCESS LINK FAULT INDICATION MECHANISM

(75) Inventors: David Elie-Dit-Cosaque, Richardson, TX (US); Kamakshi Sridhar, Plano, TX (US); Maarten Petrus Joseph Vissers, Huizen (NL); Tony Van Kerckhove, Antwerp (BG)

(73) Assignee: Alcatel Lucent, Paris (FR)

( * ) Notice: Subject to any disclaimer, the term of this patent is extended or adjusted under 35 U.S.C. 154(b) by 1118 days.

(21) Appl. No.: 11/024,077

(22) Filed: Dec. 28, 2004

(65) Prior Publication Data

US 2005/0249124 A1 Nov. 10, 2005

Related U.S. Application Data

(60) Provisional application No. 60/569,558, filed on May 10, 2004, provisional application No. 60/571,411, filed on May 14, 2004.

(51) Int. Cl.
*H04L 1/00* (2006.01)
(52) U.S. Cl. ..................... 370/241.1; 370/242
(58) Field of Classification Search .................. 370/242, 370/241.1; 714/4
See application file for complete search history.

(56) References Cited

U.S. PATENT DOCUMENTS

| 2004/0033077 | A1* | 2/2004 | Kim et al. ........................ 398/72 |
| 2004/0057727 | A1* | 3/2004 | Lim et al. ......................... 398/58 |
| 2004/0160895 | A1* | 8/2004 | Holmgren et al. ............. 370/223 |
| 2004/0190445 | A1* | 9/2004 | Dziong et al. ................. 370/225 |
| 2004/0205237 | A1* | 10/2004 | Doshi et al. .................... 709/241 |
| 2005/0099951 | A1* | 5/2005 | Mohan et al. .................. 370/241 |
| 2005/0108401 | A1* | 5/2005 | Gonda ........................... 709/227 |
| 2005/0249124 | A1* | 11/2005 | Elie-Dit-Cosaque et al. 370/242 |

FOREIGN PATENT DOCUMENTS

CN 1267442 A 9/2009

OTHER PUBLICATIONS

Sajassi et al., IETF draft-sajassi-mohan-l2vpn-vpls-fm-00.txt.*
Squire; "Metro Ethernet Forum OAM"; Metro Ethernet Forum; pp. 1-25.
"Making Universal Broadband Access A Reality"; Ethernet in the First Mile Alliance (EFMA); http://www.efmalliance.org/whitepaper.html; pp. 1-14.
"Bringing Carrier-Class Management to Ethernet in the First Mile"; Metrobility Optical Systems; pp. 1-8.
"Service delivery technologies for Metro Ethernet Networks"; Nortel Networks; pp. 1-10.
"Layer 2 Protocol Conformance Testing for Ethernet switches"; Net-O2 Technologies; pp. 1-16.
Finn; "Metro Ethernet Connection Management"; IEEE Interim meeting; Jan. 2004; pp. 1-77.
Iwamura; "OAM Flow of Ethernet OAM"; International Telecommunication Union; Feb. 2004; pp. 1-9.
Mohan; "Ethernet OAM Update Overview & Technical Aspects"; Nortel Networks; May 18, 2004; 17 pages.

* cited by examiner

*Primary Examiner* — Jianye Wu
(74) *Attorney, Agent, or Firm* — RG & Associates

(57) ABSTRACT

A network environment including a provider network coupled to a first customer network site via a first access link and to a second customer network site via a second access link. The provider network is operable with the IEEE 802.1ag standard for propagating a remote link fault condition via an Ethernet Alarm Indication and Suppression (AIS) frame or a Continuity Check (CC) frame, which is translated into a locally compliant non-IEEE 802.1ag error delivery condition so that a management entity associated with the first customer network site is appropriately alerted.

24 Claims, 8 Drawing Sheets

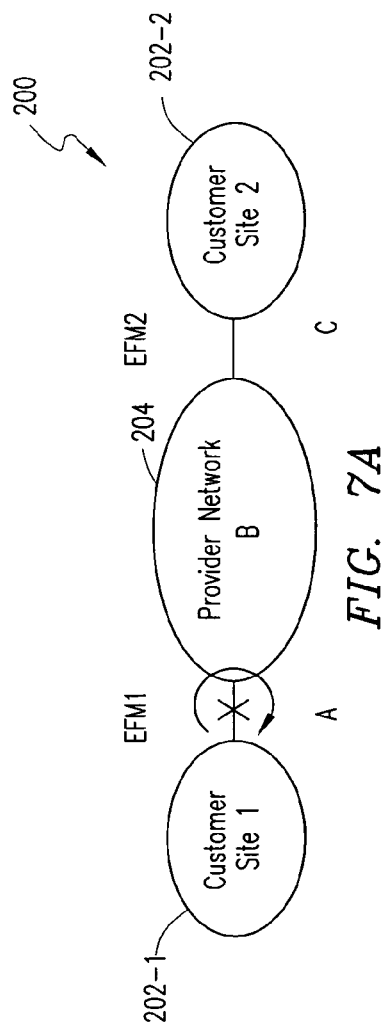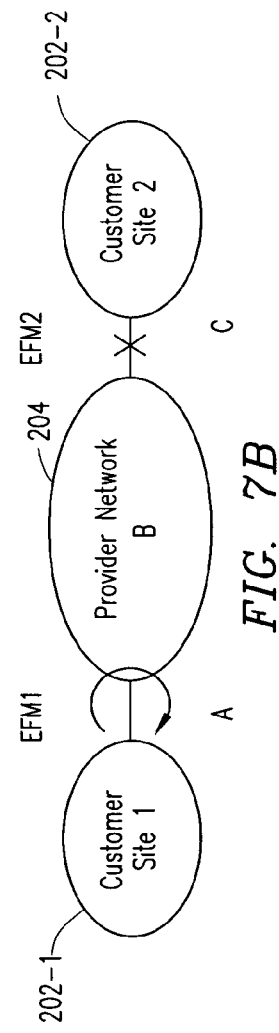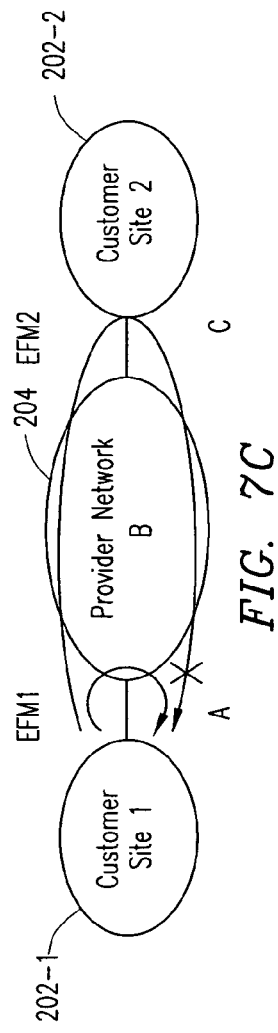

US 8,054,751 B2

REMOTE ACCESS LINK FAULT INDICATION MECHANISM

PRIORITY UNDER 35 U.S.C. §119(e) & 37 C.F.R. §1.78

This nonprovisional application claims priority based upon the following prior United States provisional patent application(s): (i) "REMOTE ACCESS LINK FAULT INDICATION," Application No. 60/569,558, filed May 10, 2004, in the name(s) of: David Elie-Dit-Cosaque, Kamakshi Sridhar, Maarten Petrus Joseph Vissers and Tony Van Kerckhove; and (ii) "REMOTE ACCESS LINK FAULT INDICATION," Application No. 60/571,411, filed May 14, 2004, in the name(s) of: David Elie-Dit-Cosaque, Kamakshi Sridhar, Maarten Petrus Joseph Vissers and Tony Van Kerckhove; each of which is hereby incorporated by reference.

INCORPORATION BY REFERENCE OF RELATED APPLICATION(S)

This application discloses subject matter related to the subject matter disclosed in the following commonly owned patent application(s): (i) "ALARM INDICATION AND SUPPRESSION (AIS) MECHANISM IN AN ETHERNET OAM NETWORK," application Ser. No. 11/023,784, filed Dec. 28, 2004, in the name(s) of: David Elie-Dit-Cosaque, Kamakshi Sridhar, Maarten Petrus Joseph Vissers and Tony Van Kerckhove; which is (are) hereby incorporated by reference.

BACKGROUND OF THE INVENTION

1. Technical Field of the Invention

The present invention generally relates to communication networks. More particularly, and not by way of any limitation, the present invention is directed to a remote access link fault indication mechanism operable with an Ethernet OAM network.

2. Description of Related Art

In order to adapt the well known Ethernet technology in a carrier-grade service environment, various standards are being developed that aim to provide advanced operations, administration and maintenance (OAM) capabilities (also referred to as Ethernet Connectivity and Fault Management or Ethernet CFM) across the entire network from one end to the other end. Since the end-to-end service network environment is typically comprised of a patchwork of diverse component networks (e.g., metro access networks and core networks using a variety of technologies) that may belong to different organizations, network operators and service providers, the Ethernet OAM plane is envisioned as a hierarchically layered domain space wherein specific OAM domains are defined corresponding to the constituent network infrastructure and provisioning. In particular, two standards, IEEE 802.1ag and ITU-T (Question 3, Study Group 13), incorporated by reference herein, that are specifically concerned with end-to-end Ethernet OAM define a customer-level domain at the highest level of hierarchy, which comprises one or more provider domains (occupying an intermediate level), each of which in turn includes one or more operator domains disposed at a lower hierarchical level. By way of standardization, the OAM domain space may be partitioned into up to a number of levels, e.g., 8 levels, each domain corresponding to a particular level, wherein a domain is defined in terms of what are referred to as flow points. In the context of the IEEE 802 specification suite, the flow points are new entities contained in Media Access Control (MAC) "interfaces" and "ports" as defined in related standards documentation. A flow point at the edge of an OAM domain is called a "Maintenance End Point" or MEP. A flow point inside a domain and visible to a MEP is called a "Maintenance Intermediate Point" or MIP. Whereas MEP nodes are used by system administrators to initiate and monitor OAM activity (by issuing appropriate OAM frames), MIP nodes passively receive and respond to OAM flows initiated by MEP nodes. An OAM domain having one or more MIP nodes is bounded by two or more MEP nodes, wherein a "Maintenance Entity" (ME) is defined to include a set of MIP nodes disposed between one MEP node and another MEP node. Thus it is possible to have more than one ME in a particular OAM domain.

Although the Ethernet OAM architecture as currently being standardized provides an impressive framework for addressing end-to-end Ethernet Connectivity and Fault Management at any level of the OAM hierarchy, a number of issues remain to be solved. Of particular concern is the scenario where customers are reluctant to implement the IEEE 802.1ag OAM technology due to cost considerations. Since the access links that couple customer network sites to a metro provider network typically belong to the customer, customer networks as well as the access link technology used may operate in a non-802.1ag environment whereas the metro provider network may comprise an 802.1ag-compliant network. One example of a non-802.1ag environment is a network environment operating according to the IEEE 802.3ah standard. In such a situation, accordingly, a need arises with respect to providing a remote access link fault indication mechanism based on interworking functionality so that a local customer site may be alerted appropriately.

SUMMARY OF THE INVENTION

In one embodiment, a scheme is disclosed for providing remote access link fault information in a heterogeneous network environment including a provider network coupled to a first customer network site via a first access link and to a second customer network site via a second access link. The provider network is operable with the IEEE 802.1ag standard for propagating a remote access link fault indication via an Ethernet Alarm Indication and Suppression (AIS) frame or a Continuity Check (CC) frame, which is translated into a locally compliant non-IEEE 802.1ag error delivery condition so that a management entity associated with the first customer network site is appropriately alerted.

In a further embodiment, the present invention is directed to a system and method operable in a network environment including a provider network coupled to a first customer network site via a first access link and to a second customer network site via a second access link, the system and method for providing an indication to the first customer network site of an access link fault relative to the second access link. An access link interface of a remote provider edge (PE) entity that is operably connected to a remote customer edge (CE) entity disposed at the second customer network site is provided with logic and processing structure for detecting the access link fault relative to the second access link. Responsive to the detecting, the remote PE entity generates an OAM control frame, e.g., an Ethernet AIS frame or a CC frame, that includes an indication of the access link fault. The OAM control frame is transmitted across the provider network, whereby the OAM control frame is received by an access link interface of a local PE entity that is operably connected to a local CE entity disposed at the first customer network site. Logic and processing structure provided with the local PE entity is operable to translate the fault indication in the OAM control frame into a locally compliant error delivery condition operable with the first customer network site. In one implementation, the locally compliant error delivery condition comprises a new Ethernet in First Mile (EFM) frame operable to include an error message based on the fault indication. In another implementation, the locally compliant error delivery condition comprises an in-band communication channel for reporting access link errors, e.g., Ethernet Local Management Interface (ELMI) signaling. In a still further implementation, an overloaded EFM link fault bit may be used for providing information regarding the fault.

In another embodiment, the present invention is directed to a system and method for discriminating among faults in a network environment including a provider network coupled to a first customer network site via a first access link and to a second customer network site via a second access link. Logic and processing structure provided with the first customer network site is operable to determine if a local loopback test initiated from the first customer network site has failed. A determination is made if a link fault bit flag is set in an EFM frame that is operable with respect to at least one of the first and second access links. Responsive to determining that the local loopback test has failed and upon determining that the link fault bit flag is set in an EFM frame transmitted between the first customer network site and the provider network, it is identified that there is a local fault condition with respect to the first access link. Alternatively, responsive to determining that the local loopback test has passed and upon determining that the link fault bit is set in an EFM frame transmitted between the second customer network site and the provider network, it is identified that there is a remote fault condition with respect to the second access link. By way of a yet another variation, responsive to determining that the local loopback test has passed and upon determining that the link fault bit is not set in the EFM frames, a further determination is made that there is a loss of end-to-end connectivity between the first and second customer network sites. Responsive thereto, it is identified there is a fault in the provider network.

In a still further embodiment, the present invention is directed to a network that comprises a provider network operable with the IEEE 802.1ag standard for supporting Ethernet Connectivity and Fault Management (CFM) operations therein. A first customer network site is operably coupled to the provider network via a first access link operable with a non-IEEE 802.1ag standard for operations therein. A second customer network site is operably coupled to the provider network via a second access link operable with a non-IEEE 802.1ag standard for operations therein. Means associated with the provider network is operable for propagating fault information relating to the second access link through the provider network to the first customer site. Appropriate logic and processing structure is provided for translating the fault information into a locally compliant non-IEEE 802.1ag error delivery condition operable with the first customer network site.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

FIGS. 7A-7C depict three different loopback scenarios in the network embodiment shown in FIG. 2.

DETAILED DESCRIPTION OF THE DRAWINGS

Figure 1:
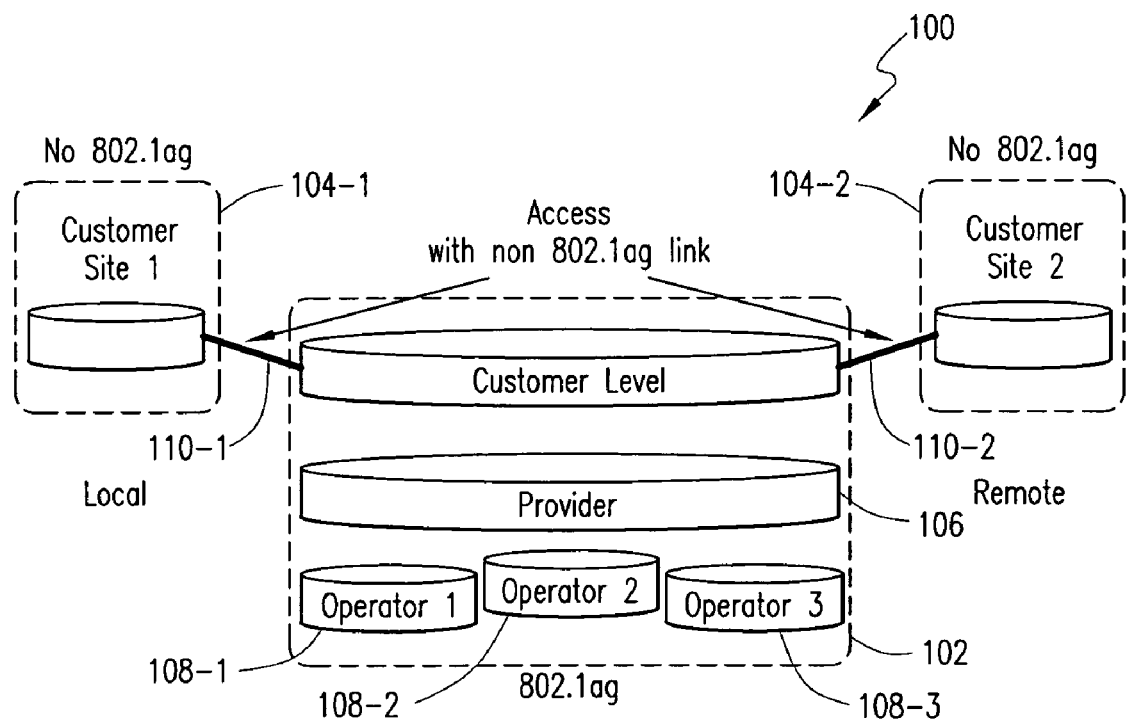
FIG. 1 depicts a network architecture embodiment wherein the teachings of the present invention may be advantageously practiced.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is a network architecture embodiment 100 wherein the teachings of the present invention may be advantageously practiced. As illustrated, the embodiment 100 is representative of a heterogeneous network environment that includes a variety of domains, e.g., customer network domains, provider network domains, and operator network domains. In general, these domains may be segregated into a domain space that is compliant with the IEEE 802.1ag standard and a domain space that is not compliant with the IEEE 802.1ag standard. For purposes of the present patent disclosure, the customer network domain, which may include one or more network sites, is provided to be a non-802.1ag domain that is coupled to a 802.1ag metro core domain 102 through any suitable access link technology such as, e.g, IEEE 802.3ah standard, xDSL, xPON, etceteras. Reference numerals 104-1 and 104-2 refer to two non-802.1ag customer network sites coupled to the metro core domain 102 via a first access link 110-1 and a second access link 110-2, respectively. The 802.1ag-complaint metro core domain 102 is preferably organized into a provider level domain 106 and a plurality of operator domains 108-1 trough 108-3 for effectuating Ethernet OAM operations therein. Additional details regarding the 802.1ag-compliant metro core domain 102 and fault propagation mechanisms therein may be found in the following commonly assigned U.S. patent application(s):"ALARM INDICATION AND SUPPRESSION (AIS) MECHANISM IN AN ETHERNET OAM NETWORK," application Ser. No. 11/023,784, filed Dec. 28, 2004, in the name(s) of: David Elie-Dit-Cosaque, Kamakshi Sridhar, Maarten Petrus Joseph Vissers and Tony Van Kerckhove (hereinafter referred to as the "Ethernet AIS patent application"), which is incorporated by reference herein.

Continuing to refer to FIG. 1, the provider level of the metro core domain 102 has no access to the management plane of the customer side access link termination device (not shown) since the access links 110-1 and 110-2 are assumed to belong to the customer. Although the customer network sites 104-1, 104-2 are not implemented with the IEEE 802.1ag standard, however, it is desirable for network management purposes to obtain some information regarding failures that can occur anywhere in the end-to-end connectivity path between the two customer network sites. In particular, it is desirable for the customer network to distinguish among the following: (i) local link failures (i.e., faults associated with the first access link 110-1); (ii) remote link failures (i.e., faults associated with the second access link 110-2), and (iii) failures in the metro core.

Figure 2:
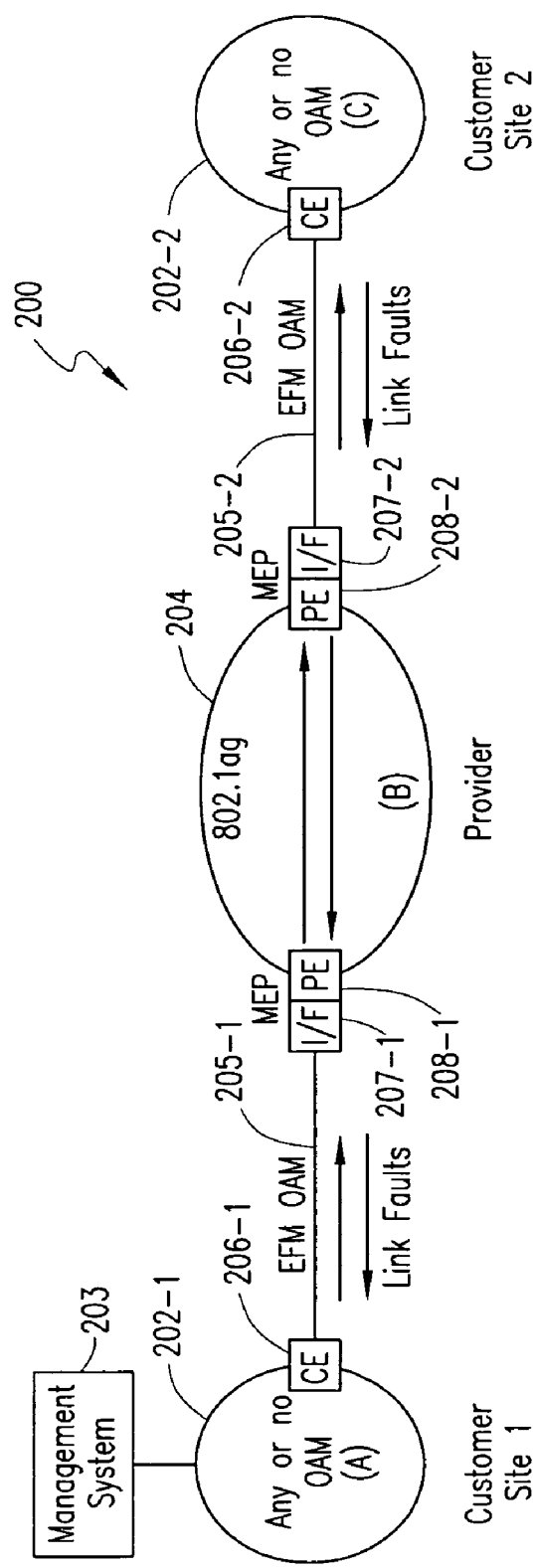
FIG. 2 depicts a network where a remote fault is propagated via an IEEE 802.1ag-compliant provider network in accordance with an embodiment of the present invention.

FIG. 2 depicts an end-to-end network 200 where a remote fault is propagated via an IEEE 802.1ag-compliant provider network 204 in accordance with an embodiment of the present invention. At a local end, a first customer site 202-1 includes a local customer edge (CE) entity 206-1 that is coupled to a local provider edge (PE) entity 208-1 disposed in the provider network 204. An access link interface 207-1 associated with the local PE 208-1 is operable with a local access link 205-1 disposed between CE 206-1 and PE 208-1. The local customer site 202-1 and associated local access link 205-1 are operable to effectuate OAM operations in accordance with the Ethernet in the First Mile (EFM) standard as specified in the IEEE 802.3ah specification. Likewise, at a remote end, a second customer site 202-2 includes a remote CE entity 202-2 for coupling to an access link interface 207-2 associated with a remote provider edge (PE) entity 208-1 that is disposed in the provider network 204. An EFM-compliant remote access link is disposed between PE 208-2 and CE 202-2.

Those skilled in the art should recognize that although only two PE entities are shown in the provider network 204, there may be additional PE entities as well that effectuate point-to-point Ethernet connections with other customer sites. Moreover, the provider network 204 may include a plurality of provider bridges that are interior to the network (i.e., not interfaced to any CE nodes). As explained in the related Ethernet AIS patent application incorporated by reference hereinabove, each PE entity is operable to effectuate a MEP that is comprised of logic and processing structure with respect to providing appropriate 802.1ag OAM functionality such as, for example, generating AIS frames, CC frames, etcetera, within the provider network 204. Additionally, as will be described in detail hereinbelow, the PE entities are operable to interwork with non-802.1ag access link interfaces (e.g., 802.3ah) so that access link fault information may be propagated across the provider network from the remote customer site 202-2 to the local customer site 202-1. Accordingly, a network management entity 203 associated with the local customer site 202-1 is operable to take appropriate action(s) based on the fault information provided thereto.

Figure 3:
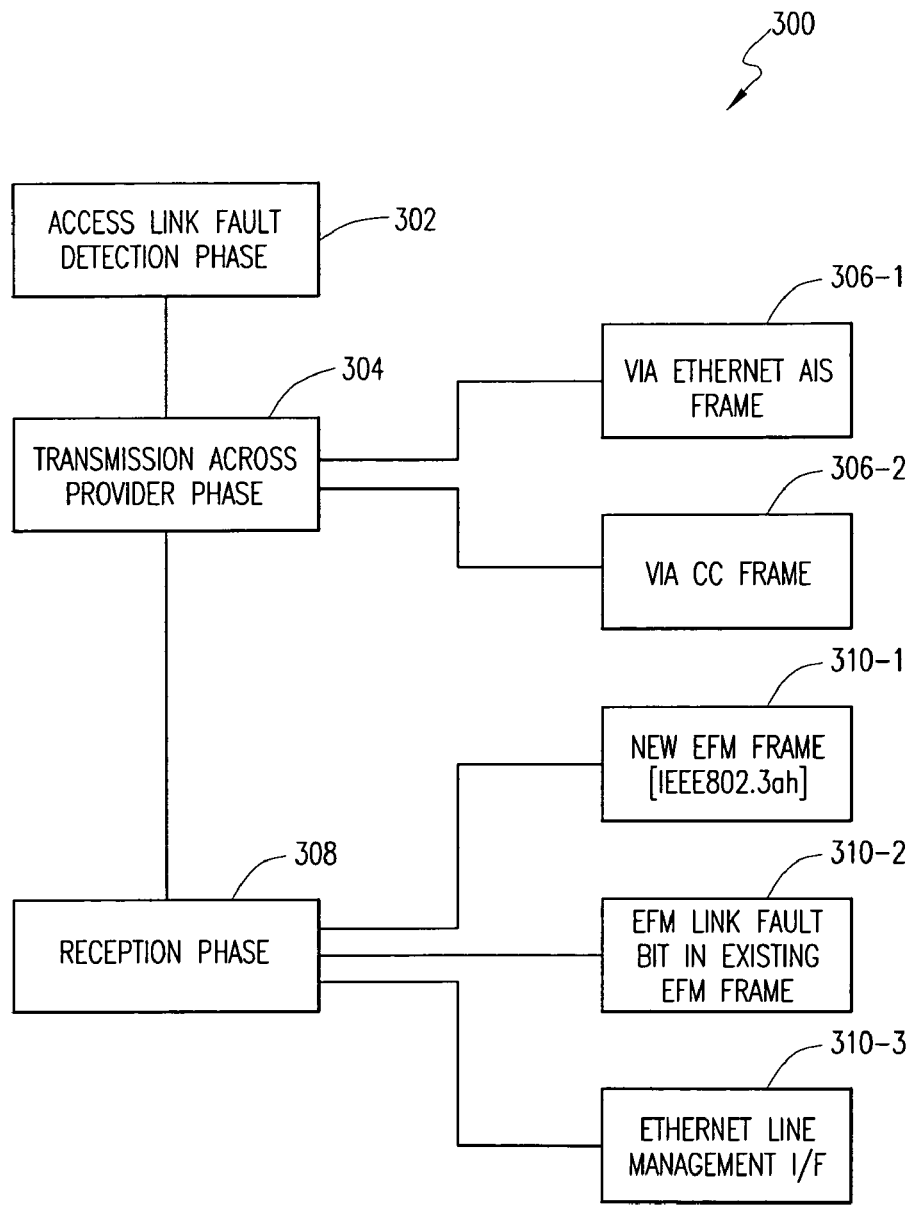
FIG. 3 depicts an exemplary embodiment of a link fault detection scheme of the present invention.

FIG. 3 depicts an exemplary embodiment of a link fault detection scheme 300 of the present invention. As illustrated, the basic mechanism may be broken into three phases: an access link fault detection phase 302, a transmission across the provider network phase 304, and a reception phase 308. With respect to the link fault detection phase 302, failures associated with remote access links, e.g., access link 205-2 in FIG. 2 described above, are detected by the PE bridges that are disposed at the boundary between the 802.1ag-compliant provider network and the non-802.1ag-compliant customer network sites. By way of implementation, the MEPs effectuated at the remote PE bridges (e.g., PE 208-2 in FIG. 2) are provided with the logic and processing structure operable to interface with the remote access link interface for detecting access links faults thereat, which may be tunneled from one customer site to another using one of following two options as part of the transmission phase 304. In one option, an Ethernet AIS frame may be generated by the remote PE, which enters the provider network as a regular Ethernet frame and, accordingly, will transparently traverse the provider network (block 306-1). The provider domain will not drop the AIS frame, which includes an indication of the remote access fault detected by the PE, since the failure indication emanated from outside the provider domain. Using the frame propagation techniques in accordance with the 802.1ag specification as explained in the related Ethernet AIS patent application, the AIS frame is transported to the local PE nodes (e.g., PE 208-1 in FIG. 2) for subsequent delivery to the customer network's management as will be described below.

In another embodiment, a CC frame is suitably modified to include the remote access fault information by way of an access link fault flag field (block 306-2). A 1-bit fault indicator may be provided in the CC frame that indicates the presence of a fault outside the provider domain, wherein the CC frame is operable to be generated by the remote PE that detects the customer fault (e.g., failures relative to the non-802.1ag-compliant remote access links that are owned by the customer). As with the AIS frame transport, the modified CC frame is propagated to the local PE nodes (e.g., PE 208-1 in FIG. 2) in accordance with the 802.1ag specification for subsequent delivery to the customer network's management system. Further, both AIS and CC frames are operable to indicate a "fault clear" condition when the remote fault has been repaired.

At the local PE nodes, fault indication information in the AIS frame or modified CC frame is translated as part of the reception phase 308 so that the CE nodes interfacing with the PE nodes can recognize the fault. Three exemplary implementations are provided for effectuating a locally compliant error delivery condition. A new EFM frame may be generated in accordance with the IEEE 802.3ah specification (block 310-1), wherein the frame's payload includes an error condition message based on the fault indication information from the AIS or CC frame. The new EFM frame is then forwarded by the local PE to the corresponding local customer site for necessary management action.

Alternatively, an existing EFM link fault bit may be used in an EFM frame (block 310-2) for indicating a remote fault condition. The receiving MEP is operable to generate a new EFM fault when a remote access link fault is indicated based on the contents of the AIS or CC frames. A combination of existing loopback mechanisms (i.e., Ping) and EFM fault bit conditions may then be used to determine whether the fault is a local fault or a remote fault. An exemplary methodology for discriminating among faults in a heterogeneous network environment based on the EFM fault bit conditions and loopback tests will be set forth in additional detail hereinbelow. In a still further embodiment, indications of the remote access link fault conditions may be forwarded using an in-band communication channel such as the Ethernet Local Management Interface (ELMI) that can report information about all access links to the customer management system (block 310-3).

Based on the foregoing discussion, it should be appreciated that the link fault detection scheme 300 of the present invention may be implemented in a variety of combinations based on the core transport mechanism and the locally compliant error delivery conditions. The following Table lists multiple implementation choices for interworking non-802.1ag access links with an 802.1ag-compliant provider network.

TABLE I

| Fault Transport; Local Delivery Option | Local Fault | Remote Fault | Provider Fault |
|---|---|---|---|
| AIS, new EFM frame | Not Needed | Yes | yes |
| AIS, ELMI | Not Needed | Yes | Yes |
| AIS, EFM link fault bit | Not Needed | With Loopback | Not Used |
| CC, new EFM frame | Not Needed | Yes | Yes |
| CC, ELMI | Not Needed | Yes | Yes |
| CC, EFM link fault bit | Not Needed | With Loopback | Not Used |

Figure 4:
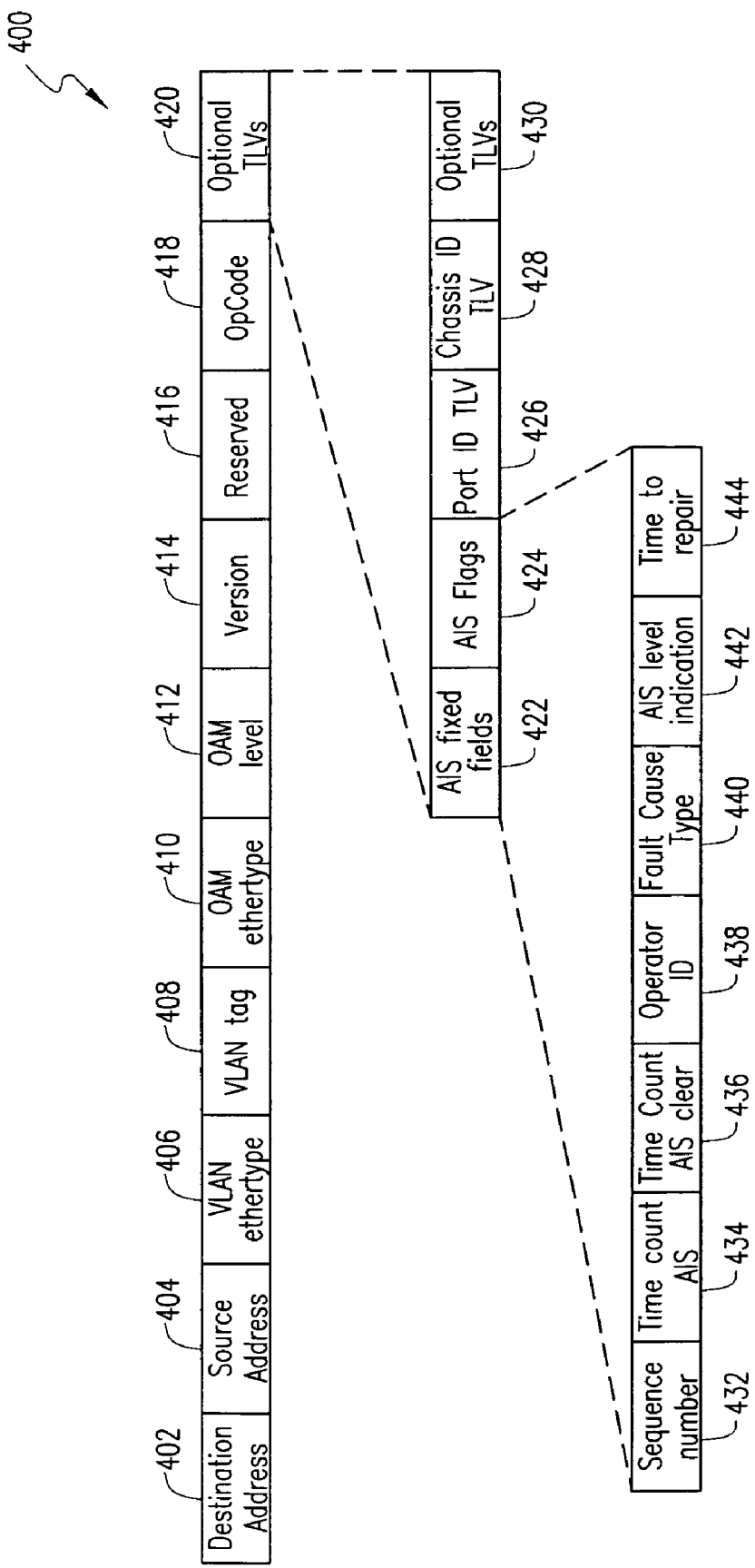
FIG. 4 depicts an Ethernet Alarm Indication and Suppression (EthAIS or AIS) frame having failure indication information fields according to one embodiment of the present invention.

Referring now to FIG. 4, depicted therein is an Ethernet AIS frame 400 having failure indication information fields according to one embodiment of the present invention which may be used for transporting an indication of an access link fault relative to a remote access link in a network environment. A number of fields such as Destination and Source MAC addresses 402 and 404, Virtual LAN (VLAN) Ether-Type 406, VLAN tag 408, OAM EtherType 410 and an OAM level field 412 are provided along with Version 414 and Reserved 416 fields. Additionally, although not shown in FIG. 4, fields such as Preamble, Postamble, Cyclic Redundancy Check (CRC), etcetera, may also be included in the AIS frame 400. An opcode 418 and a number of opcode-specific optional Type Length Value (TLV) fields 420 are included in the AIS frame 400 for providing fault indication information.

As illustrated, optional TLV field 420 may be comprised of a number of subfields, AIS Fixed fields 422, AIS Flags 424, Port ID TLV 426, Chassis ID TLV 428, and a subfield for additional optional TLVs 430. A "fault location" may be identified by way of the contents of Port ID TLV 426 and Chassis ID TLV 428, respectively. In one implementation, these fields are populated with IEEE 801.1ab MAC Service Access Point (MSAP) TLV that includes port ID and chassis ID.

Further differentiation of AIS Fixed fields 422 and AIS Flags 424 gives rise to a Sequence Number field 432, Time Count AIS field 434, Time Count AIS Clear field 436, Operator ID field 438, Fault Cause Type field 440, AIS Level Indication field 442 and Time to Repair field 444. The contents of Sequence Number field 432 uniquely identify an AIS frame transmitted due to a given fault location. Fault Cause Type 440 provides a mechanism to code different types of faults, e.g., link failure indication, congestion indication, CC frame loss, fault clear, etc. Operator ID 438 is operable to indicate which operator entity is responsible for handling the failure caused. AIS Level Indication 442 provides a mechanism to identify whether the AIS frames are from the current OAM domain level, e.g., a provider domain in a network environment, or due to a fault condition emanating from outside the provider domain.

To ensure reliability of the AIS frames, additional information is provided by way of fields such as Time Count AIS field 434, Time Count AIS Clear field 436, and Time to Repair field 444. The contents of Time Count AIS field 434 indicate how long a fault has been present (i.e., duration of time since the detection of the fault). In one implementation, for a sequence number, this field is incremented by one every time an AIS frame is generated. Time Count AIS Clear field 436 is operable to indicate an amount of time lapsed since a particular fault has been cleared. For a sequence number, this field is incremented by one every time an AIS Fault Clear frame is generated. Accordingly, even if some AIS frames are lost in transit as they are propagated through an Ethernet OAM hierarchy, Time Count AIS field 434 and Time Count AIS Clear field 436 would indicate the precise time in the past as to when a failure started or ended, respectively. For example, a Time Count AIS value of 100 indicates that a fault at the lower level was detected 100 seconds ago (based on the periodic generation of one AIS frame per second). Additional details regarding the AIS frames and their propagation in a multi-level OAM hierarchy may be found in the related Ethernet AIS patent application incorporated by reference hereinabove.

In general operation, remote access link faults are detected at the remote PE entity by its access link interface through non-802.1ag OAM (e.g., EFM OAM, ELMI, etcetera). The MEP node effectuated at the remote PE entity multicasts Ethernet AIS frame 400 towards the provider network, wherein AIS level indicator field 442 is set at a higher level (i.e., the customer level) than the current level (i.e., the provider level). Accordingly, the AIS frame is not examined in the provider domain and is passed through transparently. As a result, alarms are not generated in the provider domain since the fault is indicated to be outside the provider domain. Upon receiving the AIS frame at the local PE entity, the access link interface thereat translates the AIS message into a locally compliant error delivery condition, e.g., either ELMI signaling, a new EFM frame, or an overloaded EFM link fault bit. It should be recognized that the EFM link fault bit is overloaded (i.e., the bit is written or set) only in the case where the fault originates from outside the provider domain. If the fault originates from within the provider network, the EFM link fault bit is not overloaded.

Figure 5:
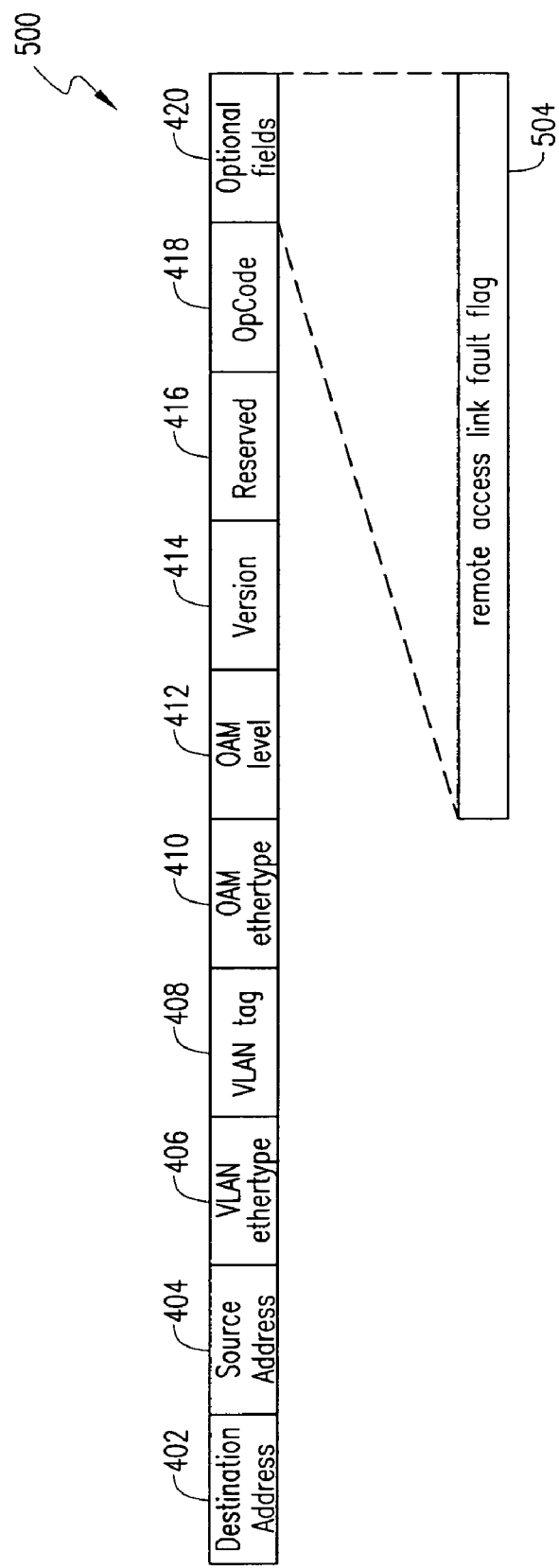
FIG. 5 depicts a Continuity Check (CC) frame having a remote failure indication information field according to one embodiment of the present invention.

FIG. 5 depicts a CC frame 500 having a remote failure indication information field according to one embodiment of the present invention. Those skilled in the art should recognize that most of the fields of the CC frame 500 are similar to those of the AIS frame 400 described above. Accordingly, they will not be described here separately. Of particular interest is the optional field segment 502 of the CC frame 500, wherein a remote access link fault flag 504 is provided for purposes of transporting a fault indication from a remote site to a local site across the provider network. In an exemplary implementation, the flag 504 may comprise a single-bit flag. Similar to the AIS frame operation set forth above, the access link interface of the remote PE entity detects a remote access link fault through non-802.1ag OAM (i.e., EFM OAM, ELMI, and the like). Responsive thereto, the MEP node of the remote PE entity sends CC frame 400 with the new remote access link fault flag, indicating the fault emanating from outside the provider domain. As before, the access link interface of the local PE entity is operable to translate the CC frame 500 into a locally compliant error delivery condition.

Figure 6:
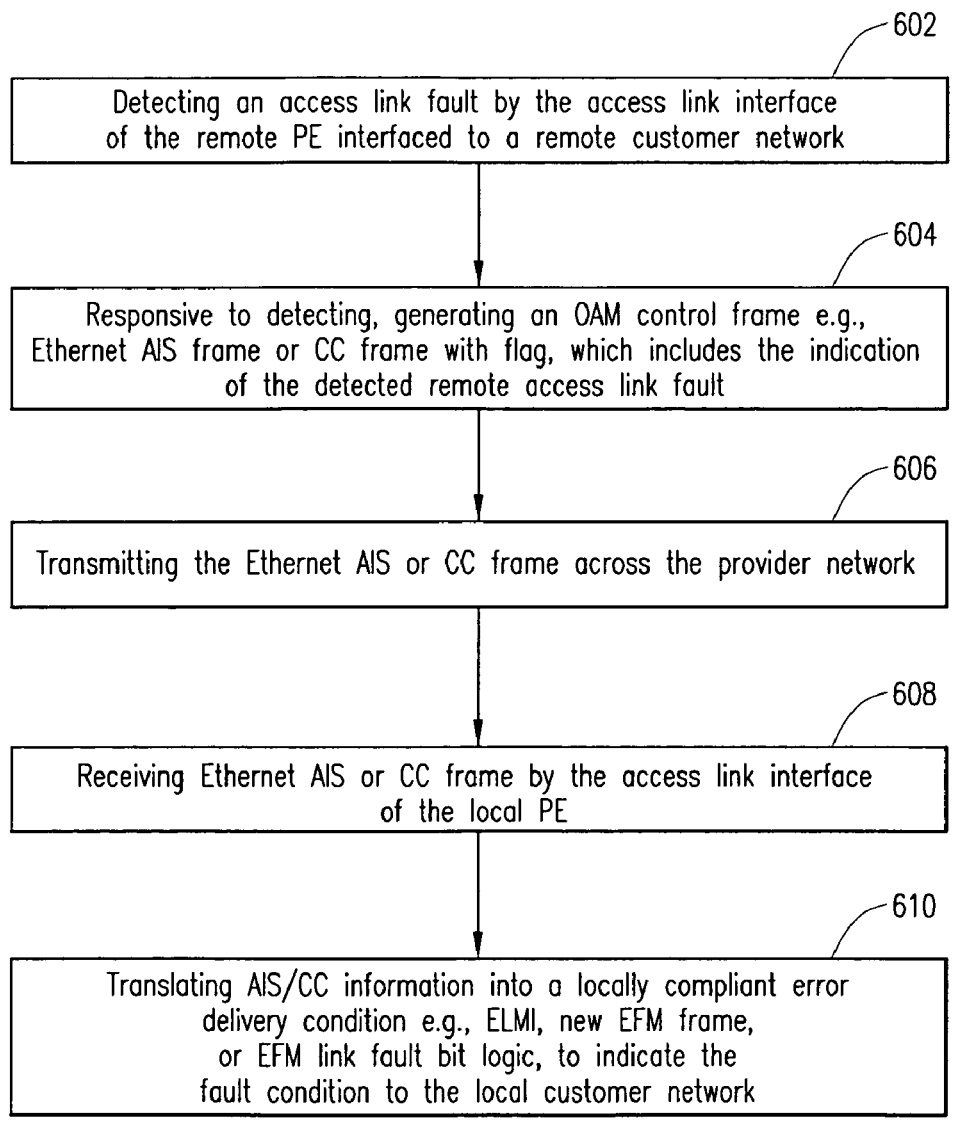
FIG. 6 is a flowchart of a method of the present invention in one aspect.

FIG. 6 is a flowchart of a method of the present invention in one aspect. At block 602, an access link fault is detected by the access link interface of a remote PE that is interfaced with the remote customer network site. Responsive to the detecting, an OAM control frame that is compliant with the IEEE 802.1ag standard is generated which includes an indication of the detected remote access link fault (block 604). As explained hereinabove, either an AIS frame or a modified CC frame may be used for providing the remote access link fault indication. Thereafter, the AIS or modified CC frame is transmitted across the provider network (block 606), whereby the OAM control frame is received by the access link interface of a local PE entity that is operably connected to a local CE entity (block 608). The fault indication information in the AIS or modified CC frames is translated into a locally compliant error delivery condition, e.g., ELMI, new EFM frame, or EFM link fault bit logic, to indicate the fault condition to the local customer network (block 610). As alluded to before, a management entity associated with the local customer network may then be altered as to the remote fault condition.

With respect to provider network faults, they may be indicated to the customer network as follows. Provider-generated AIS frames (which are different from the customer-generated AIS frames) may be translated into a local access link fault OAM frame via either ELMI or a new EFM frame for indicating the provider fault. Likewise, CC loss in the provider network can also be translated into a local access link fault OAM frame via either ELMI or a new EFM frame which includes the CC loss indication.

Figure 8:
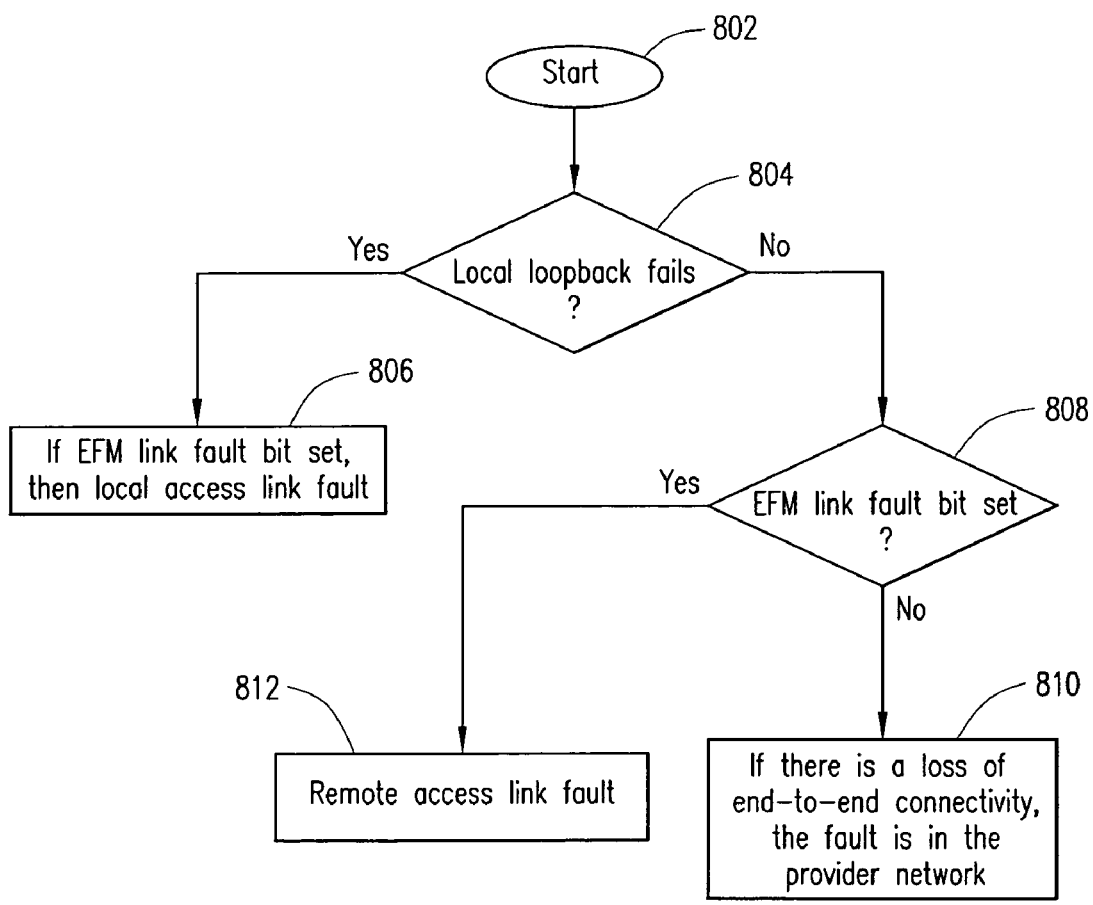
FIG. 8 is a flowchart of a method of the present invention in another aspect.

FIGS. 7A-7C depict three different loopback scenarios in the network embodiment shown in FIG. 2. Taking FIGS. 7A-7C together with the flowchart of FIG. 8, a methodology for discriminating among the network faults will now be described. As shown in FIG. 7A, if the local loopback test (i.e., Ping) fails, and there is an EFM link fault bit set, an identification is made that there is a local EFM fault at the local (or, first) access link, i.e., location A. Blocks 802, 804 and 806 describe the logic flow logic in this regard. As shown in FIG. 7B, if the local loopback test passes, and there is an EFM link fault bit set, an identification is made that there is a remote EFM fault at the remote (or, second) access link, i.e., location C. Blocks 802, 804, 808 and 812 describe the flow logic with respect to this identification. Finally, as shown in FIG. 7C, if the local loopback test succeeds, and no EFM link fault bit is set, and yet there is a loss of end-to-end connectivity, an identification is made that there is a failure in the provider network, i.e., location B. Blocks 802, 804, 808 and 810 describe the flow logic with respect to this identification.

Based on the foregoing Detailed Description, it should be appreciated that the present invention provides a beneficial fault detection and discrimination mechanism operable in a heterogeneous network environment wherein certain network domains are IEEE 802.1ag compliant and certain network domains are not IEEE 802.1ag compliant. By interworking the fault propagation mechanisms in provider networks with locally compliant error delivery mechanisms operable with the non-802.1ag customer sites, remote faults in the network may be advantageously alerted to a local customer management system.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. In a network environment including a provider network coupled to a first customer network site via a first access link and to a second customer network site via a second access link, a method for providing an indication to said first customer network site of an access link fault relative to said second access link, comprising:

detecting said access link fault relative to said second access link, said detecting by an access link interface of a remote provider edge (PE) entity that is connected to a remote customer edge (CE) entity disposed at said second customer network site, the access link interface detecting said access link fault tunneled from the first customer network site to the second customer network site using at least one of: an Ethernet Alarm Indication and Suppression (AIS) frame generated by the remote PE, and a Continuity Check (CC) frame modified to include remote access fault information by way of an access link fault flag field;

responsive to said detecting, generating by said remote PE entity an Operations, Administration and Maintenance (OAM) control frame that includes an indication of said access link fault, said control frame enters the provider network as a regular Ethernet frame and transparently traverses the provider network which will not drop the frame since the indication of said access link fault emanated from outside the provider network, wherein said frame includes an indication of the remote access fault detected by the PE;

transmitting said OAM control frame across said provider network, whereby said OAM control frame is received by an access link interface of a local PE entity that is connected to a local CE entity disposed at said first customer network site; and translating said indication of said access link fault in said OAM control frame into a locally compliant error delivery condition compatible with said first customer network site, wherein the translating said indication of said access link fault comprises generating an Ethernet in First Mile (EFM) frame having its payload include an error condition message of the AIS frame indicating the access link fault indication, and a link fault bit included in the EFM frame to indicate the remote access fault, the AIS frame comprising at least one reliability measure field including a time count field as part of the AIS frame, the time count field providing a measure of how long the access link fault has been present since detection of the access link fault, and wherein the time count field is incremented upon generation of the AIS frame.

2. The method as recited in claim 1, wherein said OAM control frame comprises an Ethernet Alarm Indication and Suppression (AIS) frame that includes a level indicator field to indicate that said access link fault has originated relative to said second access link outside said provider network.

3. The method as recited in claim 1, wherein said OAM control frame comprises a Continuity Check (CC) frame that includes a remote access link fault flag field to indicate that said access link fault has originated relative to said second access link outside said provider network.

4. The method as recited in claim 1, wherein said locally compliant error delivery condition comprises a new Ethernet in First Mile (EFM) frame that is compliant with the IEEE 802.3ah standard, said new EFM frame including an error condition message based on said indication of said access link fault in said OAM control frame.

5. The method as recited in claim 1, wherein said locally compliant error delivery condition comprises a link fault bit flag in an EFM frame that is in conjunction with a local loopback test initiated from said first customer network site.

6. The method as recited in claim 1, wherein said locally compliant error delivery condition comprises an in-band Ethernet Local Management Interface (ELMI)-compliant error message reported to a management entity associated with said first customer network site.

7. In a network environment including a provider network coupled to a first customer network site via a first access link and to a second customer network site via a second access link, a system for providing an indication to said first customer network site of an access link fault relative to said second access link, comprising:

means for detecting said access link fault relative to said second access link, wherein said means is associated with an access link interface of a remote provider edge (PE) entity that is connected to a remote customer edge (CE) entity disposed at said second customer network site, the access link interface detecting said access link fault tunneled from the first customer network site to the second customer network site using at least one of: an Ethernet Alarm Indication and Suppression (AIS) frame generated by the remote PE, and a Continuity Check (CC) frame modified to include remote access fault information by way of an access link fault flag field;

means, responsive to said detecting, for generating at said remote PE entity an Operations, Administration and Maintenance (OAM) control frame that includes an indication of said access link fault, said control frame enters the provider network as a regular Ethernet frame and transparently traverses the provider network which will not drop the frame since the indication of said access link fault emanated from outside the provider network, wherein said frame includes an indication of the remote access fault detected by the PE;

means for transmitting said OAM control frame across said provider network, whereby said OAM control frame is received by an access link interface of a local PE entity that is connected to a local CE entity disposed at said first customer network site; and means for translating said indication of said access link fault in said OAM control frame into a locally compliant error delivery condition compatible with said first customer network site, wherein the means for translating said indication of said access link fault comprises means for generating an Ethernet in First Mile (EFM) frame having its payload include an error condition message of the AIS frame indicating the access link fault indication, and a link fault bit included in the EFM frame to indicate the remote access fault, the AIS frame comprising at least one reliability measure field including a time count field as part of the AIS frame, the time count field providing a measure of how long the access link fault has been present since detection of the access link fault, and wherein the time count field is incremented upon generation of the AIS frame.

8. The system as recited in claim 7, wherein said OAM control frame comprises an Ethernet Alarm Indication and Suppression (AIS) frame that includes a level indicator field to indicate that said access link fault has originated relative to said second access link outside said provider network.

9. The system as recited in claim 7, wherein said OAM control frame comprises a Continuity Check (CC) frame that includes a remote access link fault flag field to indicate that said access link fault has originated relative to said second access link outside said provider network.

10. The system as recited in claim 7, wherein said locally compliant error delivery condition comprises a new Ethernet in First Mile (EFM) frame that is compliant with the IEEE 802.3ah standard, said new EFM frame including a error condition message based on said indication of said access link fault in said OAM control frame.

11. The system as recited in claim 7, wherein said locally compliant error delivery condition comprises a link fault bit flag in an EFM frame that is in conjunction with a local loopback test initiated from said first customer network site.

12. The system as recited in claim 7, wherein said locally compliant error delivery condition comprises an in-band Ethernet Local Management Interface (ELMI)-compliant error message reported to a management entity associated with said first customer network site.

13. A method for discriminating among faults in a network environment including a provider network coupled to a first customer network site via a first access link and to a second customer network site via a second access link, comprising:

determining if a local loopback test initiated from said first customer network site has failed;

determining if a link fault bit flag is set in an Ethernet in First Mile (EFM) frame that is compatible with respect to at least one of said first and second access links, wherein a payload of the EFM frame includes an error condition message based on fault indication information from at least one of: an Ethernet Alarm Indication and Suppression (AIS) frame and a Continuity Check (CC) frame; and responsive to determining that said local loopback test has failed and upon determining that said link fault bit flag is set in an EFM frame transmitted between said first customer network site and said provider network, identifying that there is a local fault condition with respect to said first access link;

wherein the at least one of an Ethernet AIS frame and a CC frame is generated in response to detecting an access link fault with respect to said second access link, said detecting by an access link interface of a remote provider edge (PE) entity that is connected to a remote customer edge (CE) entity disposed at said second customer network site, and wherein the generating operation comprises translating said indication of said access link fault into a locally compliant error delivery condition compatible with said first customer network site, the translating said indication of said access link fault further comprises generating an Ethernet in First Mile (EFM) frame having its payload include an error condition message of the AIS frame indicating the access link fault indication, and a link fault bit included in the EFM frame to indicate the remote access fault, the AIS frame comprising at least one reliability measure field including a time count field as part of the AIS frame, the time count field providing a measure of how long the access link fault has been present since detection of the access link fault, and wherein the time count field is incremented upon generation of the AIS frame.

14. The method as recited in claim 13, further comprising, responsive to determining that said local loopback test has passed and upon determining that said link fault bit is set in an EFM frame transmitted between said second customer network site and said provider network, identifying that there is a remote fault condition with respect to said second access link.

15. The method as recited in claim 13, further comprising:

determining that said local loopback test has passed; determining that said link fault bit is not set in an EFM frame transmitted between said first customer network site and said provider network;

determining that said link fault bit is not set in an EFM frame transmitted between said second customer network site and said provider network; and responsive to determining that there is a loss of end-to-end connectivity between said first and second customer network sites, identifying that there is a fault in said provider network.

16. A system for discriminating among faults in a network environment including a provider network coupled to a first customer network site via a first access link and to a second customer network site via a second access link, comprising:

means for determining if a local loopback test initiated from said first customer network site has failed;

means for determining if a link fault bit flag is set in an Ethernet in First Mile (EFM) frame that is compatible with respect to at least one of said first and second access links, wherein a payload of the EFM frame includes an error condition message based on fault indication information from at least one of: an Ethernet Alarm Indication and Suppression (AIS) frame and a Continuity Check (CC) frame; and means, responsive to determining that said local loopback test has failed and upon determining that said link fault bit flag is set in an EFM frame transmitted between said first customer network site and said provider network, for identifying that there is a local fault condition with respect to said first access link;

wherein the at least one of an Ethernet AIS frame CC frame is generated in response to detecting an access link fault with respect to said second access link, said detecting by an access link interface of a remote provider edge (PE) entity that is connected to a remote customer edge (CE) entity disposed at said second customer network site, and wherein the generating comprises translating said indication of said access link fault into a locally compliant error delivery condition compatible with said first customer network site, the translating said indication of said access link fault further comprises generating an Ethernet in First Mile (EFM) frame having its payload include an error condition message of the AIS frame indicating the access link fault indication, and a link fault bit included in the EFM frame to indicate the remote access fault, the AIS frame comprising at least one reliability measure field including a time count field as part of the AIS frame, the time count field providing a measure of how long the access link fault has been present since detection of the access link fault, and wherein the time count field is incremented upon generation of the AIS frame.

17. The system as recited in claim 16, further comprising means, responsive to determining that said local loopback test has passed and upon determining that said link fault bit is set in an EFM frame transmitted between said second customer network site and said provider network, for identifying that there is a remote fault condition with respect to said second access link.

18. The system as recited in claim 16, further comprising:
means for determining that said local loopback test has passed;
means for determining that said link fault bit is not set in an EFM frame transmitted between said first customer network site and said provider network;
means for determining that said link fault bit is not set in an EFM frame transmitted between said second customer network site and said provider network; and
means, responsive to determining that there is a loss of end-to-end connectivity between said first and second customer network sites, for identifying that there is a fault in said provider network.

19. A network, comprising:
a provider network compatible with the IEEE 802.1ag standard for supporting Ethernet Connectivity and Fault Management (CFM) operations therein;
a first customer network site coupled to said provider network via a first access link implementing a non-IEEE 802.1ag standard for operations performed;
a second customer network site coupled to said provider network via a second access link implementing a non-IEEE 802.1ag standard for operations performed;

means for propagating fault information relating to said second access link through said provider network to said first customer site, said means for propagating fault information comprises a frame generated by a Maintenance End Point (MEP) node associated with a remote provider edge (PE) entity; and means for translating said fault information into a locally compliant non-IEEE 802.1ag error delivery condition configured with said first customer network site;

wherein the frame is generated in response to detecting an access link fault with respect to said second access link, said detecting by an access link interface of the remote provider edge (PE) entity that is connected to a remote customer edge (CE) entity disposed at said second customer network site, and wherein the generating operation comprises translating said indication of said access link fault into a locally compliant error delivery condition compatible with said first customer network site, the translating said indication of said access link fault further comprises generating an Ethernet in First Mile (EFM) frame having its payload include an error condition message of an AIS frame indicating the access link fault indication, and a link fault bit included in the EFM frame to indicate the remote access fault, the AIS frame comprising at least one reliability measure field including a time count field as part of the AIS frame, the time count field providing a measure of how long the access link fault has been present since detection of the access link fault, and wherein the time count field is incremented upon generation of the AIS frame.

20. The network as recited in claim 19, wherein said means for propagating fault information comprises an Ethernet Alarm Indication and Suppression (AIS) frame generated by a Maintenance End Point (MEP) node associated with a remote provider edge (PE) entity, said AIS frame including a level indicator field to indicate that a link fault has originated relative to said second access link outside said provider network.

21. The network as recited in claim 19, wherein said means for propagating fault information comprises a Continuity Check (CC) frame generated by a Maintenance End Point (MEP) node associated with a remote provider edge (PE) entity, said CC frame including a remote access link fault flag field to indicate that a link fault has originated relative to said second access link outside said provider network.

22. The network as recited in claim 19, wherein said locally compliant non-IEEE 802.1ag error delivery condition comprises a new Ethernet in First Mile (EFM) frame that is compliant with the IEEE 802.3ah standard, said new EFM frame including a error condition message based on said fault information.

23. The network as recited in claim 19, wherein said locally compliant non-IEEE 802.1ag error delivery condition comprises a link fault bit flag in an EFM frame that is operable in conjunction with a local loopback test initiated from said first customer network site.

24. The network as recited in claim 19, wherein said locally compliant non-IEEE 802.1ag error delivery condition comprises an in-band Ethernet Local Management Interface (ELMI)-compliant error message reported to a management entity associated with said first customer network site.

* * * * *